(12) United States Patent
Bora et al.

(10) Patent No.: US 10,846,015 B2
(45) Date of Patent: Nov. 24, 2020

(54) EARLY IO CONTROL TECHNIQUES FOR A REMOTE DATA FACILITY

(71) Applicant: EMC IP Holding Company LLC, Hopkinton, MA (US)

(72) Inventors: Bhaskar Bora, Shrewsbury, MA (US); Richard C. Goodwill, Shrewsbury, MA (US); Toufic Tannous, Solon, OH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 37 days.

(21) Appl. No.: 16/384,859

(22) Filed: Apr. 15, 2019

(65) Prior Publication Data
US 2020/0326878 A1 Oct. 15, 2020

(51) Int. Cl.
*G06F 3/06* (2006.01)
(52) U.S. Cl.
CPC ............ *G06F 3/0655* (2013.01); *G06F 3/061* (2013.01); *G06F 3/0679* (2013.01)

(58) Field of Classification Search
CPC ....... G06F 3/061; G06F 3/0655; G06F 3/0679
See application file for complete search history.

(56) References Cited

U.S. PATENT DOCUMENTS

| 2018/0165584 A1* | 6/2018 | Jha ................... G06F 11/3419 |
| 2020/0106698 A1* | 4/2020 | Rao .................... H04L 47/125 |
| 2020/0133807 A1* | 4/2020 | Tannous ............. G06F 12/0292 |

* cited by examiner

*Primary Examiner* — Ryan Bertram
(74) *Attorney, Agent, or Firm* — Amin, Turocy & Watson, LLP

(57) ABSTRACT

Architectures and techniques are described that can address challenges associated with engaging a procedure that has the potential to produce beneficial effects in some case and detrimental effects in other cases. One example can be engaging an early IO (EIO) protocol in a synchronous remote data facility (SRDF), but only when doing so will have a positive impact on performance and/or response times.

14 Claims, 10 Drawing Sheets

EARLY IO CONTROL TECHNIQUES FOR A REMOTE DATA FACILITY

TECHNICAL FIELD

The present application relates generally to techniques for controlling early IO (EIO) procedures in a remote data facility and more particularly to determining when EIO procedures or other suitable procedures are to be activated or deactivated.

BACKGROUND

An important metric for remote data facilities that provide remote storage services or the like, is response time. In an attempt to reduce response times, it is common that a remote data facility (RDF) implements early IO.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
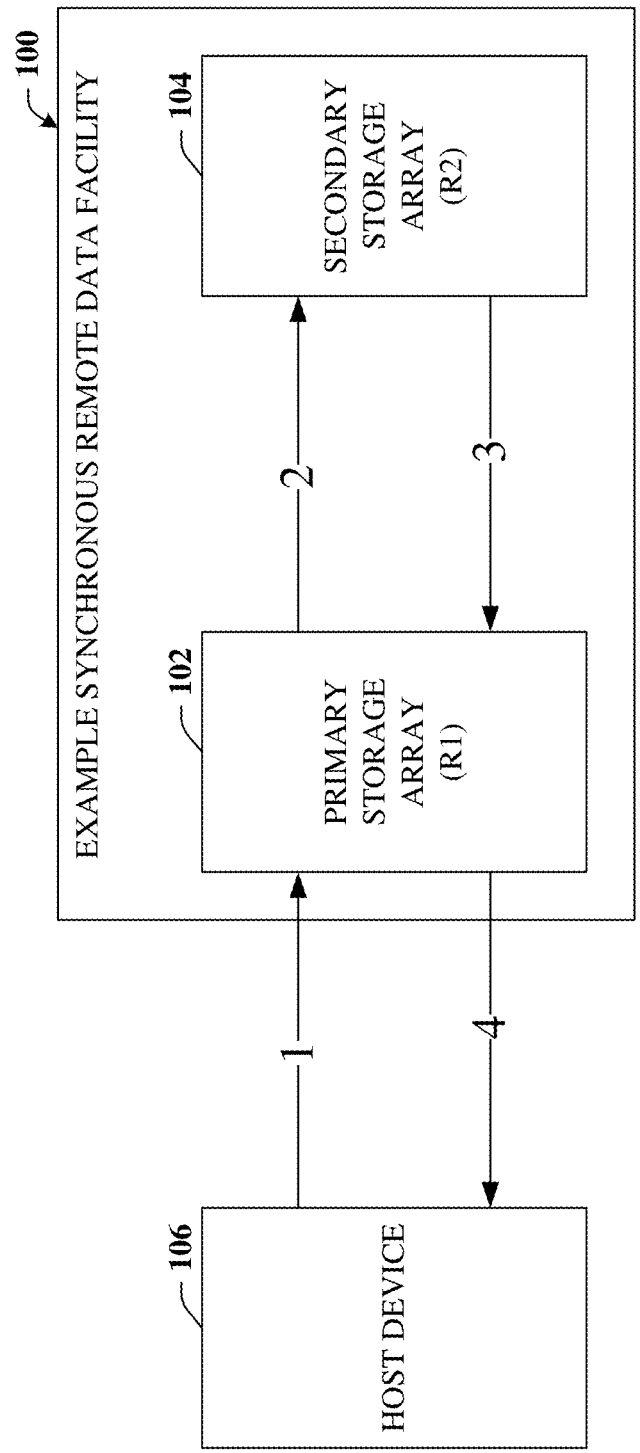
FIG. 1 illustrates a block diagram of an example synchronous remote data facility (SRDF) and an associated response time to an IO request from a host in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates an example response time for an example synchronous remote data facility (SRDF) 100 in accordance with certain embodiments of this disclosure. SRDF 100 can include primary storage array 102 (e.g., R1) and a backup or secondary storage array 104 (e.g., R2). A client of a storage service can employ host device 106 to access services of SRDF 100. For example, when the client desires to store data to the SRDF, host device 106 can generate an IO transaction (e.g., a write transaction) that is transmitted to primary storage array 102, which is can be stage one of a four-stage process. Typically, a remote application (RA) of primary storage array 102 will receive the client data and write that data to primary storage array 102. Once that data is written to primary storage array 102, a copy of the client data can be transmitted to secondary storage array 104 during stage two. An RA of secondary storage array 104 can receive and then store the client data. At stage three, once the client data is stored to secondary storage array 104, secondary storage array 104 can transmit an acknowledgment indicating the client data has been saved. At stage four, primary storage array 102 can forward this acknowledgment to host device 106.

In this typical synchronous example, the response time between host device 106 requesting the IO transaction and receiving an acknowledgement that the IO transaction has been completed can be an aggregation of the latency of all four stages.

As noted previously, an important metric for remote data facilities is response time, and improving response time can represent a beneficial result. Because remote data facilities typically have multiple storage arrays, such as primary storage array 102 and secondary storage array 104, that each fully receives client data before moving on to the next stage, response times can suffer. In order to improve response times, early IO (EIO) was introduced. Generally, EIO relies on the concept of performing processing in advance to speed up an IO transaction. For instance, while a frontend of SRDF 100 is receiving the client data, certain processing can be performed in order to prepare the R1 and R2 for the impending IO transaction. Under the right conditions, using EIO can improve response times. However, EIO does not always improve response times, as is further illustrated at FIG. 2.

Figure 2:
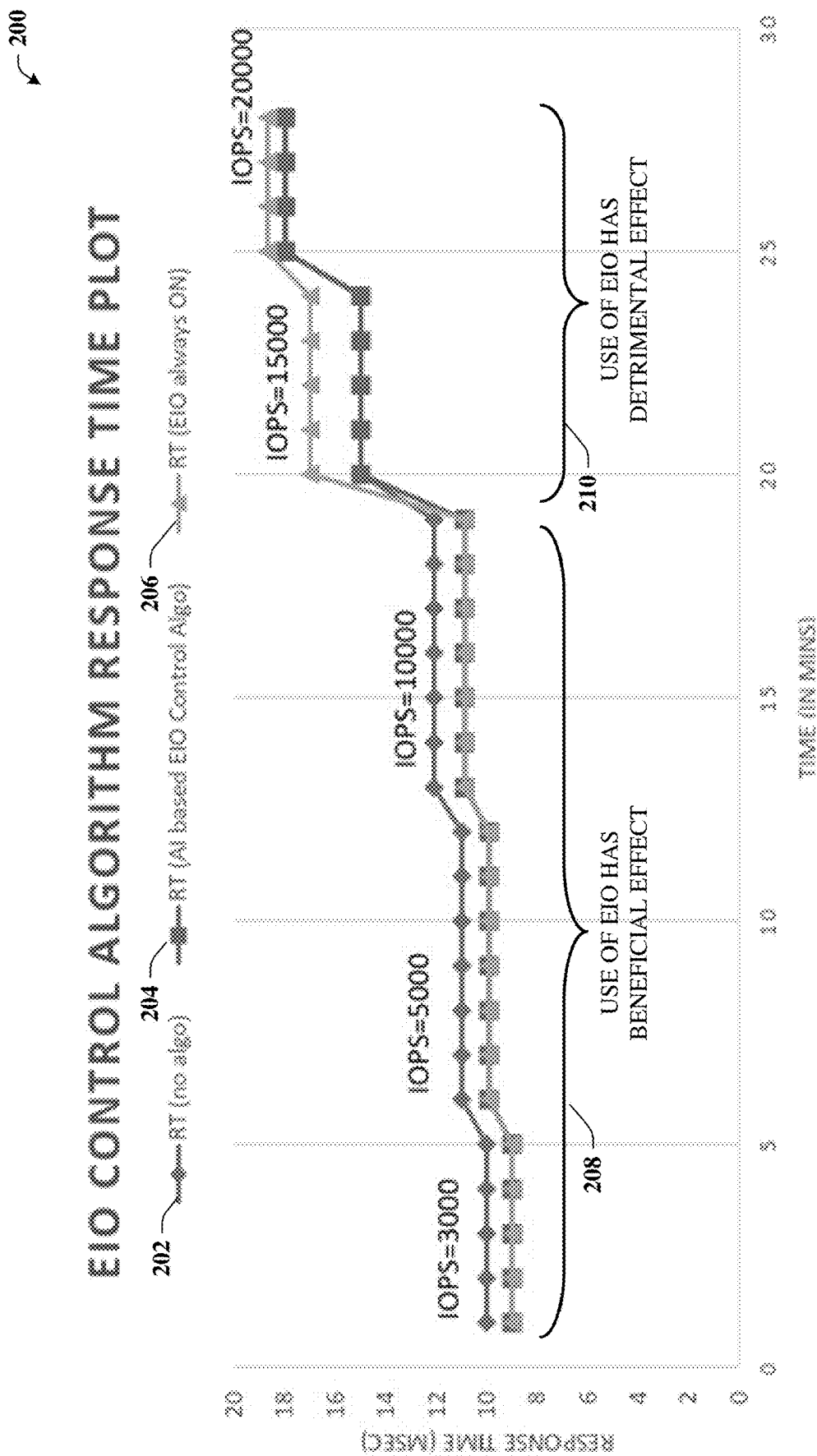
FIG. 2 depicts an example graph illustrating multiple plots that demonstrate use of EIO might improve or degrade response times in accordance with certain embodiments of this disclosure.

Turning now to FIG. 2, graph 200 is depicted. Graph 200 illustrates an example in which use of EIO improves and degrades response times in accordance with certain embodiments of this disclosure. In more detail, graph 200 depicts three separate curves or plots represented as response time (in milliseconds) over time (in minutes). Plot 202 illustrates response times when EIO is not used or always off. Plot 206 illustrates response times when EIO is always used. Plot 204 illustrates example response times when EIO is activated or deactivated according to techniques detailed herein, which is further detailed below.

Graph 200 also depicts IO transactions per second (IOPS) being handled by the remote data facility, which, in this example, increase over time. During time range 208 (e.g., the first 18 minutes), when IOPS are relatively low, using EIO significantly improves response times, therefore providing a beneficial effect. However, during time range 210, when IOPS are relatively high, using EIO substantially degrades response times producing a detrimental effect. From the above, two significant observations can be made.

First, an SRDF that does not implement EIO is not an optimal solution in terms of response times, but an SRDF that always uses EIO also is not an optimal solution. EIO can improve response times in some cases (e.g., time range 208), but can degrade response times in other cases (e.g., time range 210). An optimal or better solution, such as plot 204 that is representative of certain disclosed techniques, can be one that intelligently chooses when to activate and/or deactivate EIO. In that regard, plot 204 matches the improved response times during time range 208 (e.g., because EIO is turned on) but does not suffer the degradation during time range 210 (e.g., because EIO is turned off).

Second, while IOPS is a known variable upon which EIO gains (or losses) depend, there are several other factors, some of them known, but others that are unknown. For example, known variables that affect whether using EIO produces response time benefits or detriments are JO data transaction length, SRDF link load, SRDF emulation load, and mainframe frontend channel load.

While graph 200 represents a simplified example, because there are so many variables upon which EIO gains are dependent in real world scenarios, intelligently determining when to engage EIO therefore represents a significant challenge. Furthermore, because there are unknown variables that affect EIO gains, previous attempts to model this problem space have been unsuccessful or incomplete.

Because the success of EIO is highly dependent on when those EIO techniques are engaged, the disclosed subject matter is directed in some embodiments to engaging EIO when such will provide performance gains (e.g., faster response times) but not when performance will degrade. The disclosed techniques do not rely on understanding of the causes of degraded performance, and can be implemented independently of application-specific causes. Thus, it is appreciated that the disclosed techniques can be applied to any suitable problem space in which activating a procedure is sometimes beneficial but other times detrimental. As a representative example employed throughout this disclosure, the disclosed techniques are applied to determining when to engage EIO in an SRDF, but other applications are envisioned.

The disclosed subject matter can employ reinforcement learning (RL). RL is a type of artificial intelligence (AI) approach, specifically a machine-learning approach, in which real world scenarios are modeled based on states and actions. A goal of RL can be to influence the outcome by taking an explicit and substantially optimal action in all cases. As used herein 'substantially' in the context of 'substantially optimal' or the like can mean that the outcome results in an optimal solution, but while the decision-making agent is being trained or otherwise learning the optimal solutions, non-optimal decisions can result. However, these non-optimal decisions might occur for a few seconds or less, which is deemed insignificant over the 30-minute time window depicted in FIG. 2 or other real world use cases.

Figure 3:
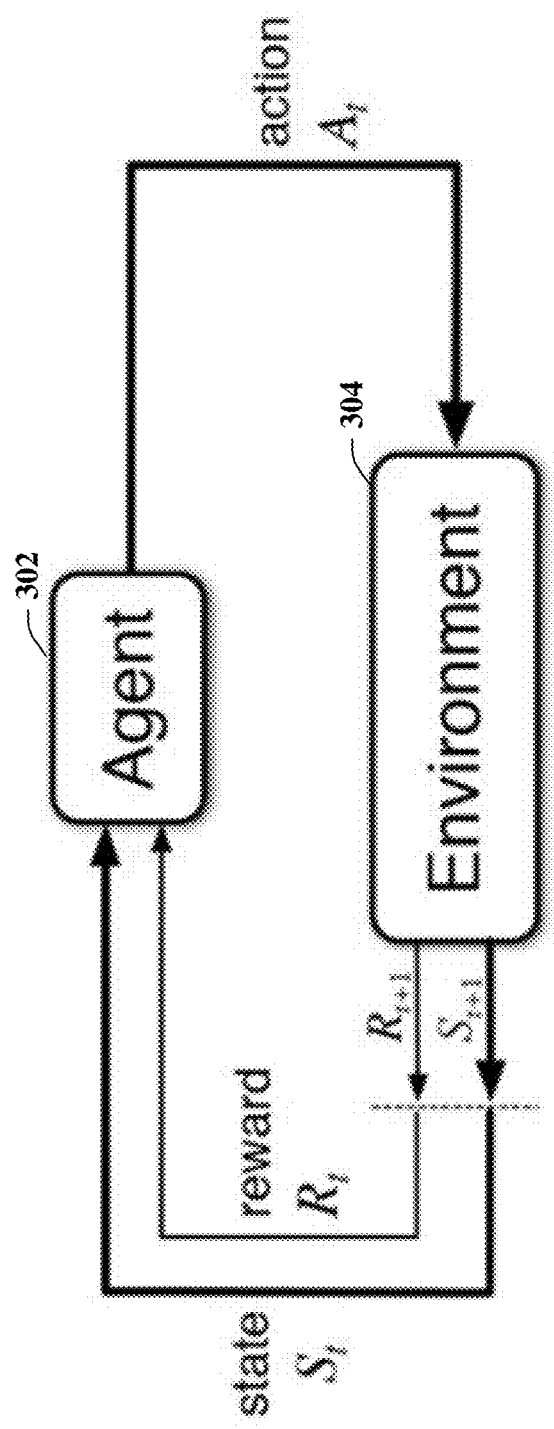
FIG. 3 depicts a flow diagram that illustrates high-level functionality of a reinforced learning (RL) model in accordance with certain embodiments of this disclosure.

With reference now to FIG. 3, flow diagram 300 is depicted. Flow diagram 300 illustrates high-level functionality of a reinforced learning model in accordance with certain embodiments of this disclosure. Flow diagram 300 depicts agent 302 and environment 304. At time t, environment 304 can be in a given state, denoted $S_t$, and agent 302 can apply an action, denoted $A_t$, to environment 304. This action will have an effect on environment 304, which can be determined after a transition to time t+1. For example, environment 304 can be monitored or measured and state $S_{t+1}$ can be determined. Based on a quality or character of $S_{t+1}$, a reward, $R_{t+1}$, can be assigned. After some number of iterations, the reward values can be employed to identify an optimal action for agent 302 to invoke for any state in which environment 304 happens to be.

It is appreciated that because data can be collected empirically (e.g., to enable RL training), variables that affect, or otherwise cause, environment 304 to be in one state as opposed to another need not be identified. Rather, an optimal action can be determined for any present or future state of environment 304. These and other aspects are further described in the context of an EIO example.

Example Systems

Figure 4:
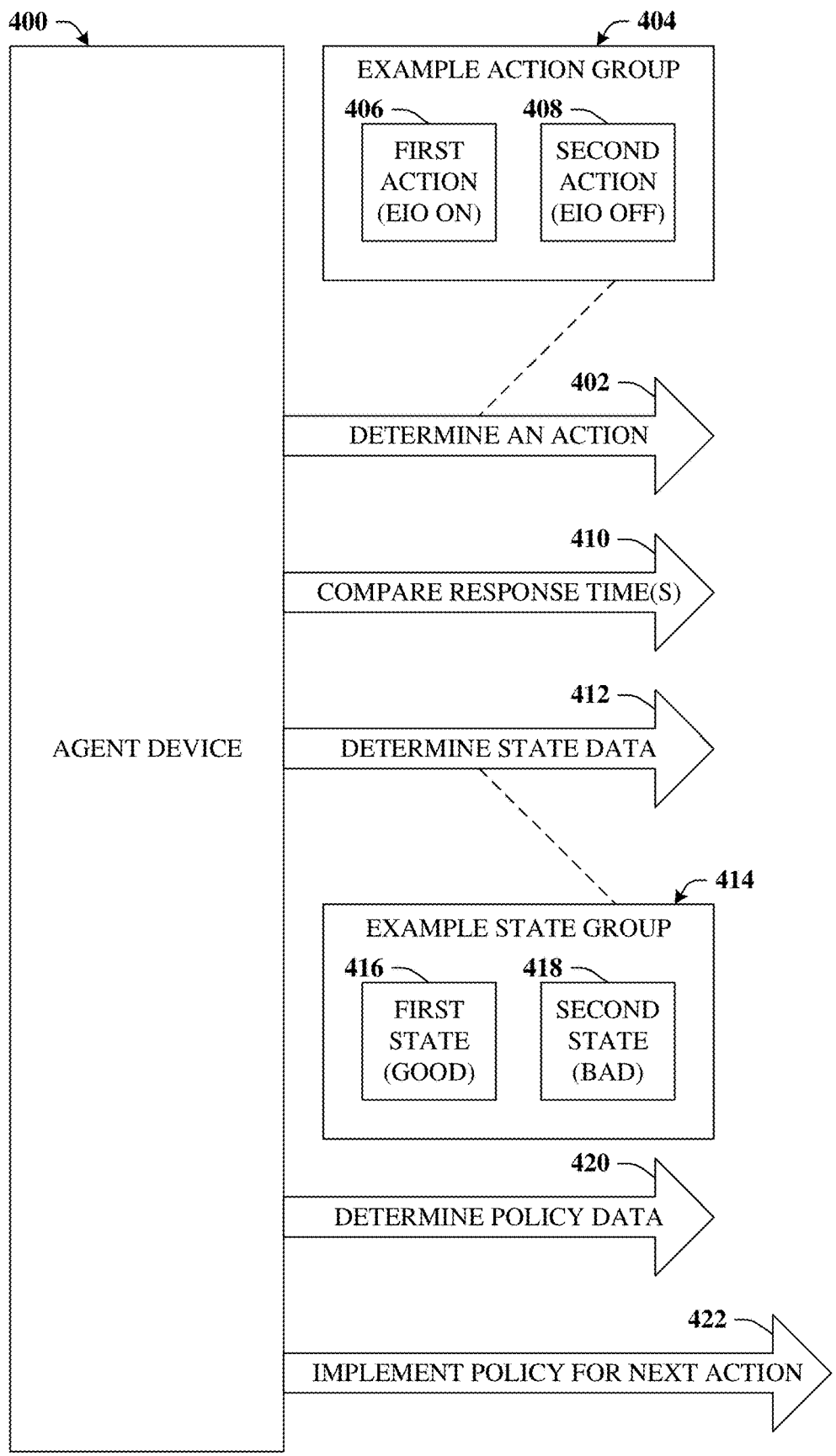
FIG. 4 illustrates a block diagram of an example agent device that can activate or deactivate EIO in a substantially optimal manner in accordance with certain embodiments of this disclosure.

Referring now to FIG. 4, a block diagram of an example agent device 400 is depicted. Agent device 400 can activate or deactivate EIO in a substantially optimal manner in accordance with certain embodiments of this disclosure. Generally, agent device 400 (and other system of devices detailed herein) can comprise a processor and a memory that stores executable instructions that, when executed by the processor, facilitate performance of operations. Examples of the memory and processor can be found with reference to FIG. 10. It is to be appreciated that the computer 1002 can represent a server device or a client device and can be used in connection with implementing one or more of the systems, devices, or components shown and described in connection with FIG. 4 and other figures disclosed herein.

In some embodiments, agent device 400 can operate in the role of agent 302 of FIG. 3. As a representative example, agent device 400 can be a device of a SRDF that executes a remote application (RA). That is, a device that executes the RA can also execute instructions that represent the agent. It is therefore understood that an SRDF having many RA devices can have many agents operating contemporaneously. It is further understood that portions of a storage array managed by a given RA can represent environment 304.

Agent device 400 can determine an action, which is illustrated at reference numeral 402. This action can be selected from action group 404. As illustrated, action group 404 comprises first action 406 and second action 408. First action 406 can be to activate (or keep active) EIO, while second action 408 can be to deactivate (or keep inactive) EIO. Hence, there are only two actions agent device 400 can take in this example, which effectively distill to EIO on, or EIO off. As explained previously, response time gains (or losses) due to EIO vary for both known and unknown reasons, so one objective of this disclosure is to identify an optimal or substantially optimal action (e.g., EIO on or EIO off) to take in order to minimize or substantially minimize response times. In other words, determining to effectively always use EIO when such will result in performance gains, but never when such will result in performance degradation.

To accomplish these and other related ends, agent device 400 can compare various response times, as depicted by reference numeral 410. For example, agent device 400 can compare a current response time of a current IO operation to a previous response time of a previous IO operation. In response to such comparisons, agent device 400 can determine state data, depicted at reference numeral 412. This state data can include elements that are indicative of a current state of the current IO operation.

The current state can be selected from among members of state group 414, which can include first state 416 and second state 418. First state 416 can be indicative of the current response time being less than or equal to the previous response time. Likewise, second state 418 can be indicative of the current response time being greater than the previous response time. Thus, in this example, the current IO operation can be in one of two states, which can be referred to as 'good' or 'bad', 'positive' or 'negative', 'beneficial' or 'detrimental', or the like. For example, if response times improved (e.g., based on an empirical data comparison described at 410), such is considered 'good', whereas if response times degraded, such is considered 'bad'. It is appreciated that the actions taken (e.g., EIO on/off) for both the previous IO operation and the current IO operation are known, and the relative effects of those actions on the state are known to some degree.

The above-described information can be used by agent device 400 to determine policy data 420. Policy data 420 can identify a next action from among action group 404 (e.g., EIO on/off) that is to be applied to a next IO procedure. This next action can represent an optimal action to be taken to produce the desired state (e.g., 'good') and/or avoid a less desired state (e.g., 'bad'). For example, the next action can be determined, as a function of the current state, to substantially minimize a next response time of the next IO operation. In some embodiments, the policy data can specify the optimal action to take for each state of state group 414. Thus, the policy data can be followed regardless of what state occurs.

As illustrated at reference numeral 422, agent device 400 can implement the policy specified by the policy data. For example, agent device 400 can instruct a device, element, or component that manages EIO procedures to operate according to the policy data. In some embodiments, such can take the form of providing the policy data to an RA or multiple RAs.

Figure 5:
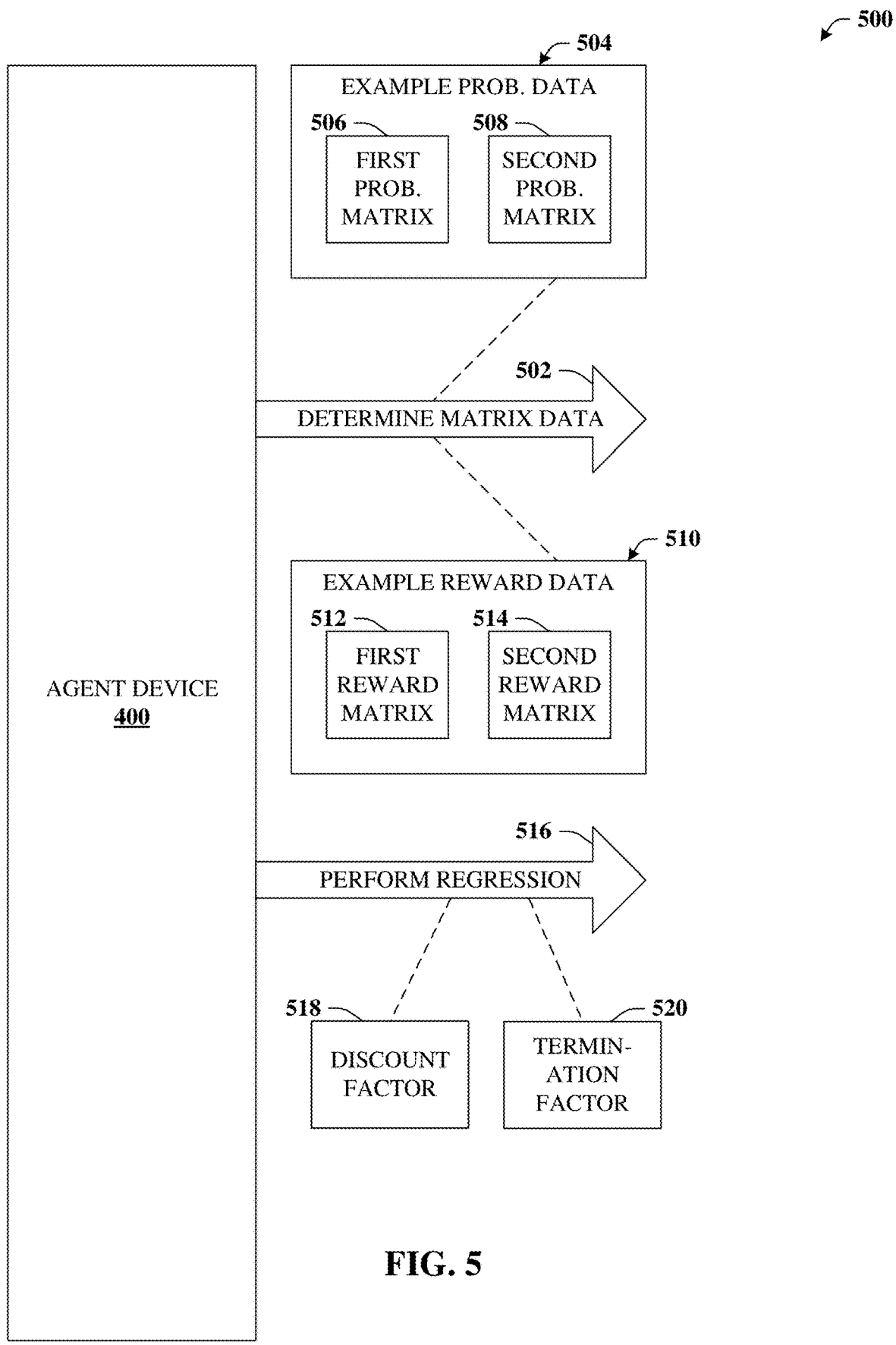
FIG. 5 depicts a block diagram of an example system illustrating additional aspects or elements in connection with determining whether to activate or deactivate EIO in a substantially optimal manner in accordance with certain embodiments of this disclosure.

Turning now to FIG. 5, system 500 is depicted. System 500 illustrates additional aspects or elements in connection with determining whether to activate or deactivate EIO in a substantially optimal manner in accordance with certain embodiments of this disclosure. FIG. 5 can include all or portions of agent device 400 or other elements of FIG. 4.

In some embodiments, agent device 400 can determine matrix data, which is illustrated at reference numeral 502. In some embodiments, matrix data can be included in the state data detailed in connection with FIG. 4. For example, when determining the state data in connection with reference numeral 412, matrix data can be determined.

In some embodiments, matrix data can include various types of matrices, examples of which can be found in connection with probability matrix data 504 and reward matrix data 510. For instance, probability matrix data 504 can include first probability matrix 506 and second probability matrix 508. First probability matrix 506 can be indicative of probabilities that a state of state group 404 will occur in response to first action 406 (e.g., EIO on). Second probability matrix 508 can be indicative of probabilities that the state of state group 404 will occur in response to second action 408 (e.g., EIO off).

Similarly, reward matrix data 510 can include first reward matrix 512 and second reward matrix 514. First reward matrix 512 can be indicative of reward values assigned to an occurrence of the state in connection with first probability matrix 506. Second reward matrix 514 can be indicative of reward values assigned to the occurrence of the state in connection with second probability matrix 508.

To provide additional context, consider that in some embodiments, for each IO operation, the respective response times can be measured and recorded. In some embodiments, such can be performed in fixed, but potentially configurable, intervals. A representative example of this fixed interval can be, e.g., 200 milliseconds, but other intervals are envisioned depending on the implementation. Hence, it is understood that time t of FIG. 3 can represent one of these time intervals. For example, t can represent one 200 millisecond time interval and time t+1 can represent a subsequent 200 millisecond time interval.

In those embodiments, the response time can be determined as an average of all the response times tracked during a given interval and compared to other average values of previous or subsequent intervals. At the end of a given time interval, probability matrix data 504 and reward matrix data 510 can be determined and/or updated and a regression procedure indicated at reference numeral 516 can be performed. The regression procedure can simulate action from action group 404 to discover the optimal action for each state from state group 414. This optimal action can be the action of action group 404 that yields maximum reward values This regression procedure can be iteratively run to determine the most optimal policy for both states through an approach termed discounted rewards. For example, the regression procedure can comprise a discount factor 518 that reduces a weight of older reward values. In some embodiments, discount factor 518 can be configurable based on implementation. A representative example of discount factor 518 in the present EIO implementation can be 0.8, but other values are contemplated. Furthermore, the regression procedure can comprise termination factor 520. Termination factor 520 can facilitate termination of the regression procedure, for example, in response to a first iterative result of the regression procedure varying from a second iterative result of the regression procedure by less than termination factor 520. A representative example value of termination factor 520 can be 0.000125, but other values are contemplated and the value selected can be a function of implementation.

To illustrate functionality of termination factor 520, consider that results of the regression procedure can produce vectors that will converge on the optimal solution. When two vectors differ by less than termination factor 520, such can indicate that further regression will not significantly change the outcome. Thus, such can represent a signal to exit the regression procedure, which otherwise could be run in perpetuity.

It is further noted that the policy data (e.g., an optimal action for each state) can be determined once the regression procedure terminates. Thereafter, the policy data can be followed by agent device 400 at any time. Policy data can be updated based on changes to the subject environment, changes to IO characteristics, or for other reasons.

Figure 6:
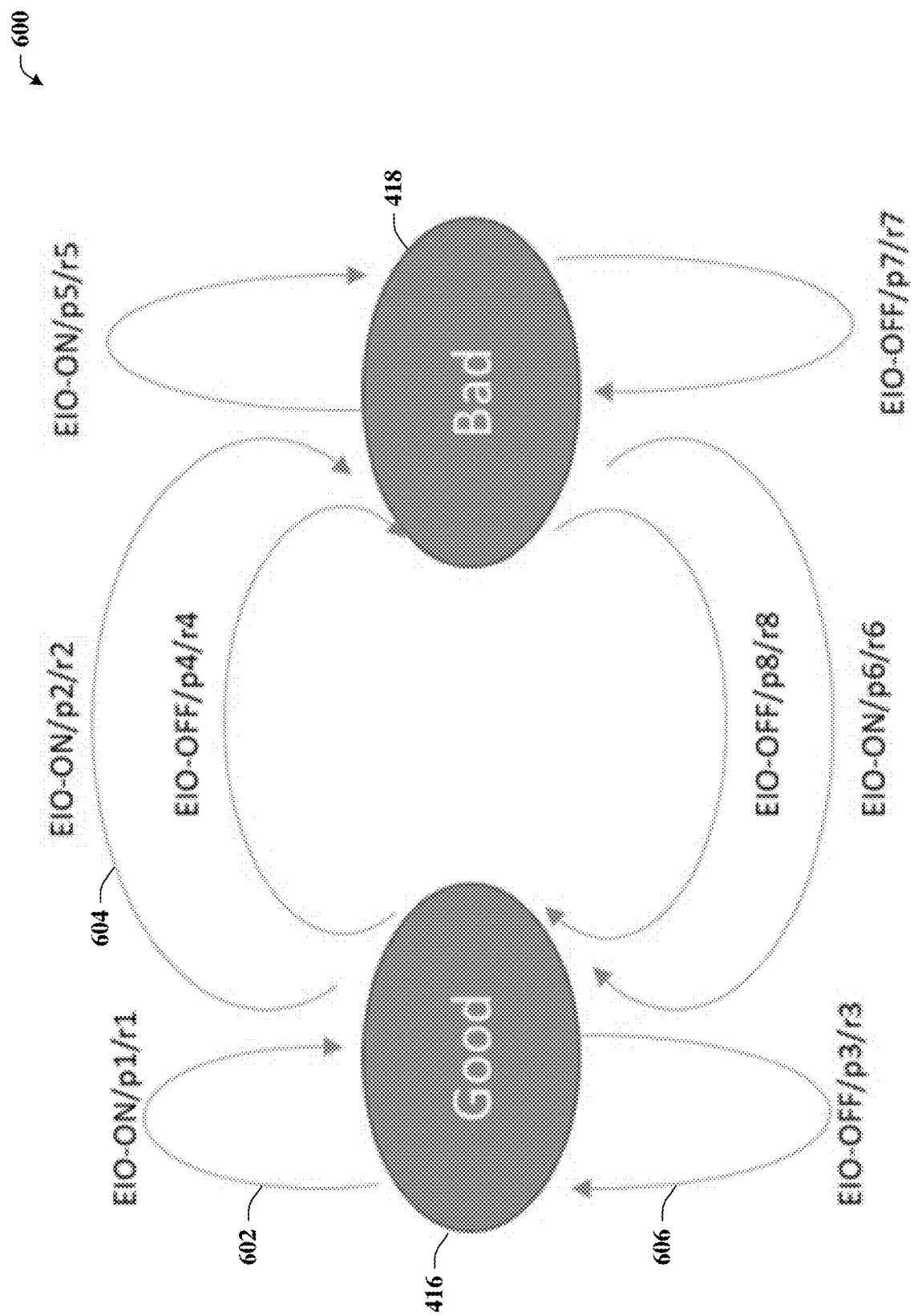
FIG. 6 depicts an example diagram that illustrates a two-state Markov decision process that can be utilized for EIO control in accordance with certain embodiments of this disclosure.

With reference now to FIG. 6, diagram 600 is depicted. Diagram 600 illustrates a two-state Markov decision diagram that can be utilized for EIO control in accordance with certain embodiments of this disclosure. Diagram 600 has two states, which map to first state 416, labeled 'good', and second state 418, labeled 'bad'. Recall, the good state (e.g., first state 416) can occur when a measured average response time of IO transactions occurring in a current interval is determined to be less than or equal to the previous average response time of previous IO transaction occurring during a previous interval. Otherwise, the bad state (e.g., second state 418) can result.

Diagram 600 further illustrates several transitions, two of which are referenced, denoted transition 602, transition 604, and transition 606. These transitions can represent transitions from one time interval to another, such as a transition from the previous time interval to the current time interval and so forth. For a given transition, the state may change or stay the same. For example, in the case of transition 602, the state remained 'good' from the first interval to the next, but the state changed from 'good' to 'bad' at transition 604.

As a group, these transitions can reflect all possibilities of state group 414 and all possible actions of action group 404. For instance, while transitions 602 and 604 represent the case in which EIO is on (e.g., first action 406), transition 606 represents the case in which EIO is off (e.g., second action 408). In other words, the transitions can collectively represent all the permutations of possible states and actions, each with an associated probability matrix and reward matrix that can be determined at reference numeral 502.

For example, considering transition 602 in more detail, it is observed that initially the good state is extant and EIO is turned on. The probability of this state occurring, which can be determined empirically, is p1, whereas the probability of the bad state occurring is p2 illustrated at transition 604. Since there are only two states, p1+p2=1. At any state one of two actions can be taken (e.g., EIO-on and EIO off). Any action implement can lead to the next state based on previous and current response time measurements.

Once trained, agent 400 can identify the optimal action to be applied to a next IO procedure. As noted, this optimal action can be a function of the current state. That is, when in the good state, an optimal action might be EIO-on, but when in the bad state, the optimal action might be EIO-off. It is noted that the optimal action might be EIO-on (or EIO-off) in both the good and bad states, which is determined by the action that produces the highest rewards.

To provide additional insight into one example of the mechanisms detailed herein, consider the following example code for determining the policy data, where 'dfactor' can represent discount factor 518, 'epsilon' can represent termination factor 520. Further, 'tpm' represents an associated transition probability matrix and 'trm' represents an associate transition reward matrix. Both tpm and trm can be included in the matrix data that is generated in connection with reference numeral 502.

```
Function Compute(Input: #action, #current_state, #best_value// Output: #value[ ], #policy[ ], #best_value)
{
/* Find the total rewards for current_state->GOOD and current_state->BAD*/   sum=tpm[#action][#current_state][GOOD]*(trm[#action][#current_state][GOOD]+
dfactor*value[GOOD]);
sum+=tpm[#action][#current_state][BAD]*(trm[#action][#current_state][GOOD]+dfactor*value[BAD]);
if(sum>#best_value)/*update the value function and policy*/
{
#best=sum;
policy[current_state]=#action;/*this is the optimal action*/
value[current_state]=#best;/*this is the value for the optimal policy*/
}
}
}
Function Core_Simulation( )
{
/*Saved current 'value' function into 'old_value' */ old_value[ ]=value[ ];
/*goal is to find the best action which gives maximum rewards when current state is GOOD*/
best_value=-233232;/*very small value*/
/*Compute the optimal policy for current_state=GOOD and Action=ON*/ Compute(ON, GOOD, best_value//&value[ ], &policy[ ], &best_value);
/*Compute the optimal policy for current_state=GOOD and Action=OFF*/ Compute(OFF, GOOD, best_value//&value[ ], &policy[ ], &best_value);
best_value=-233232;/*very small value*//*
Compute the optimal policy for current_state=BAD and Action=ON*/ Compute(ON, BAD, best_value//&value[ ], &policy[ ], &best_value);
/*Compute the optimal policy for current_state=BAD and Action=OFF*/ Compute(OFF, BAD, best_value//&value[ ], &policy[ ], &best_value);
/*At this point we have the value function and the most optimal policy for reach state */
/*value function is a vector (and we have old and new value vectors) so see if they are too close and if so then stop the simulation.*/
norm=-1;
if(ABSOLUTE(value[GOOD]-old_value[GOOD])>norm)
norm=AB SOLUTE(value[GOOD]-old_value[GOOD]);
if(ABSOLUTE(value[BAD]-old_value[BAD])>norm)
norm=AB SOLUTE(value[BAD]-old_value[BAD]);
if(norm<epsilon) then return;/*break the simulation*/
}
```

Example Methods

Figure 7:
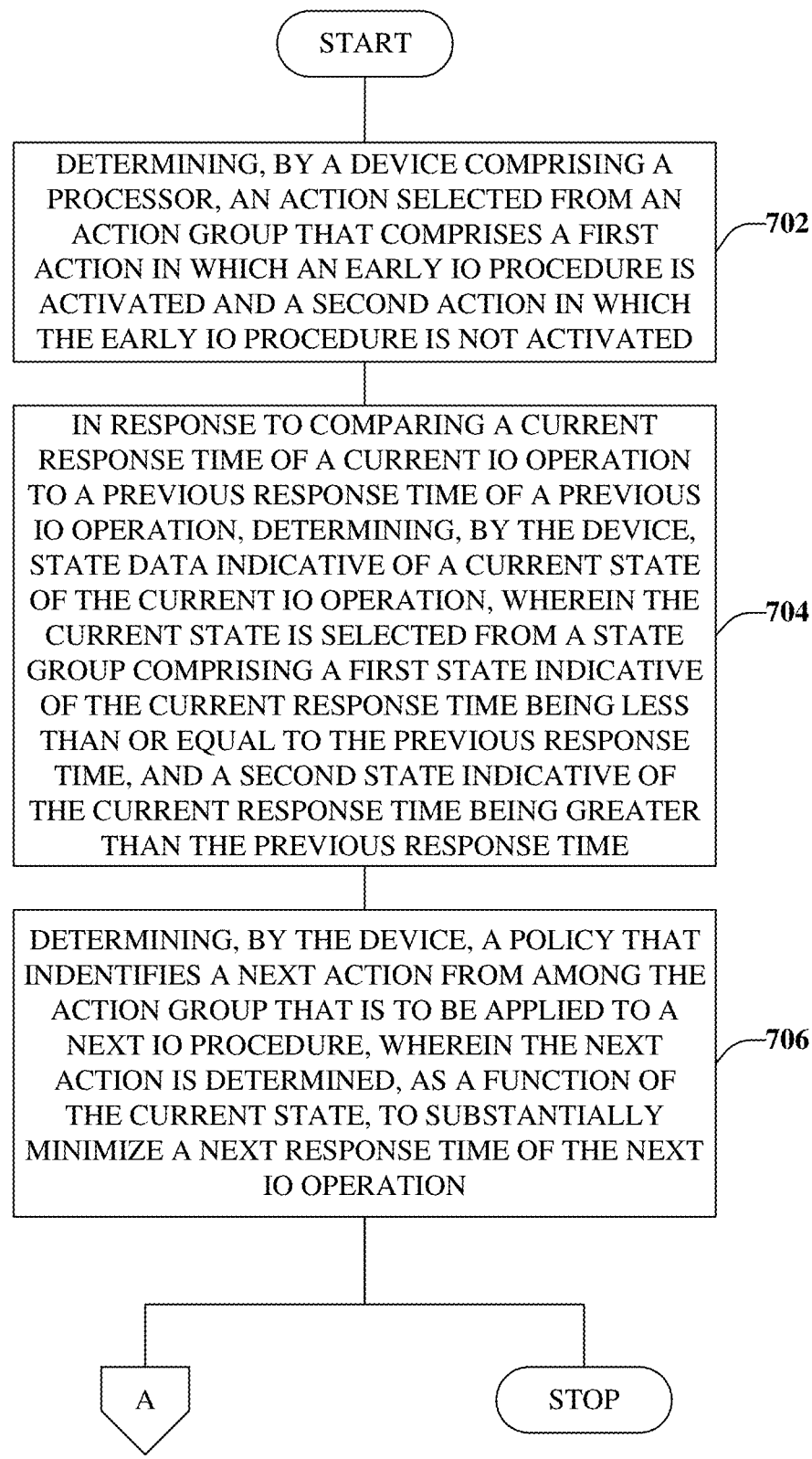
FIG. 7 illustrates an example methodology that can activate or deactivate EIO in a substantially optimal manner in accordance with certain embodiments of this disclosure.
Figure 8:
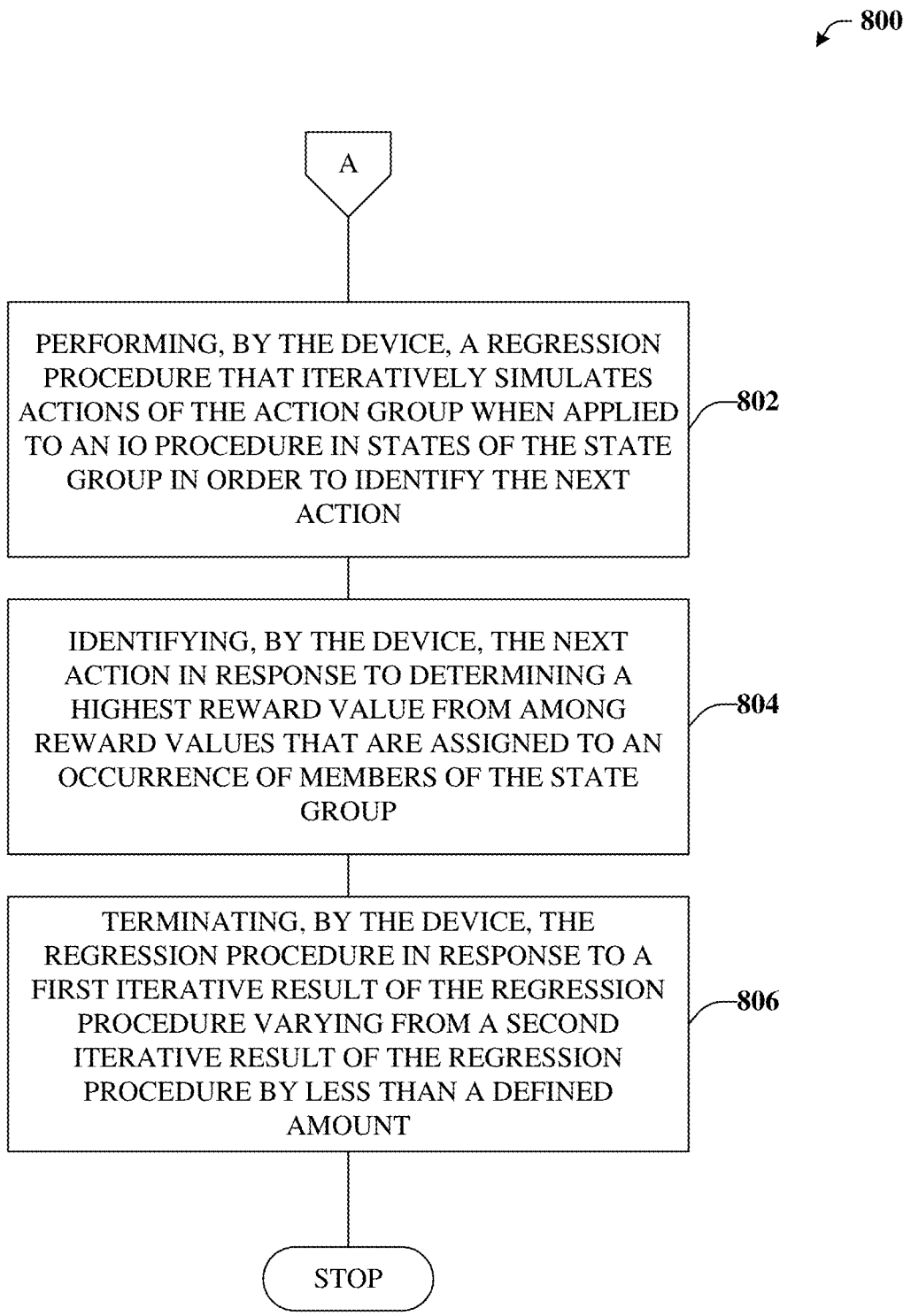
FIG. 8 illustrates an example methodology that can provide for additional aspect or elements in connection with obtaining a substantially optimal outcome in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Referring now to FIG. 7, exemplary method 700 is depicted. Method 700 can activate or deactivate EIO in a substantially optimal manner in accordance with certain embodiments of this disclosure. While method 700 describes a complete methodology, in some embodiments, method 700 can include one or more elements of method 800, as illustrated by insert A.

At reference numeral 702, a device comprising a processor can determine an action. The action can be selected from among members of an action group. The action group can comprise, for example, a first action in which an EIO procedure is activated and a second action in which the EIO procedure is not activated. In other words, the device can determine whether to activate the EIO procedure or not.

At reference numeral 704, in response to comparing a current response time of a current IO operation to a previous response time of a previous IO operation, the device can determine state data. This state data can be indicative of a current state of the current IO operation. The current state can be selected from among members of a state group. By way of example, the state group can comprise a first state indicative of the current response time being less than or equal to the previous response time, and a second state indicative of the current response time being greater than the previous response time. In other words, if response times improved, the first state can be identified, whereas if response times did not improve, the second state can be identified.

At reference numeral 706, the device can determine a policy that identifies a next action from among the action group. It is understood that the next action can be applied to a next IO procedure. For example, the next action can be determined, as a function of the current state, to substantially minimize a next response time of the next IO operation. As depicted, method 700 can proceed to insert B, which is further detailed in connection with FIG. 8, or stop.

Turning now to FIG. 8, exemplary method 800 is depicted. Method 800 can provide for additional aspect or elements in connection with obtaining a substantially optimal outcome in accordance with certain embodiments of this disclosure.

At reference numeral 802, the device introduced at reference numeral 702 comprising a processor can perform a regression procedure. For example, the regression procedure can iteratively simulate actions of the action group when applied to an IO procedure in states of the state group. As one result, the regression procedure can identify the next action that is deemed to be optimal or substantially optimal.

At reference numeral 804, the device can identify the next action in response to determining a highest reward value from among reward values that are assigned to an occurrence of members of the state group. At reference numeral 806, the device can terminate the regression procedure in response to a first iterative result of the regression procedure varying from a second iterative result of the regression procedure by less than a defined amount.

Example Operating Environments

Figure 9:
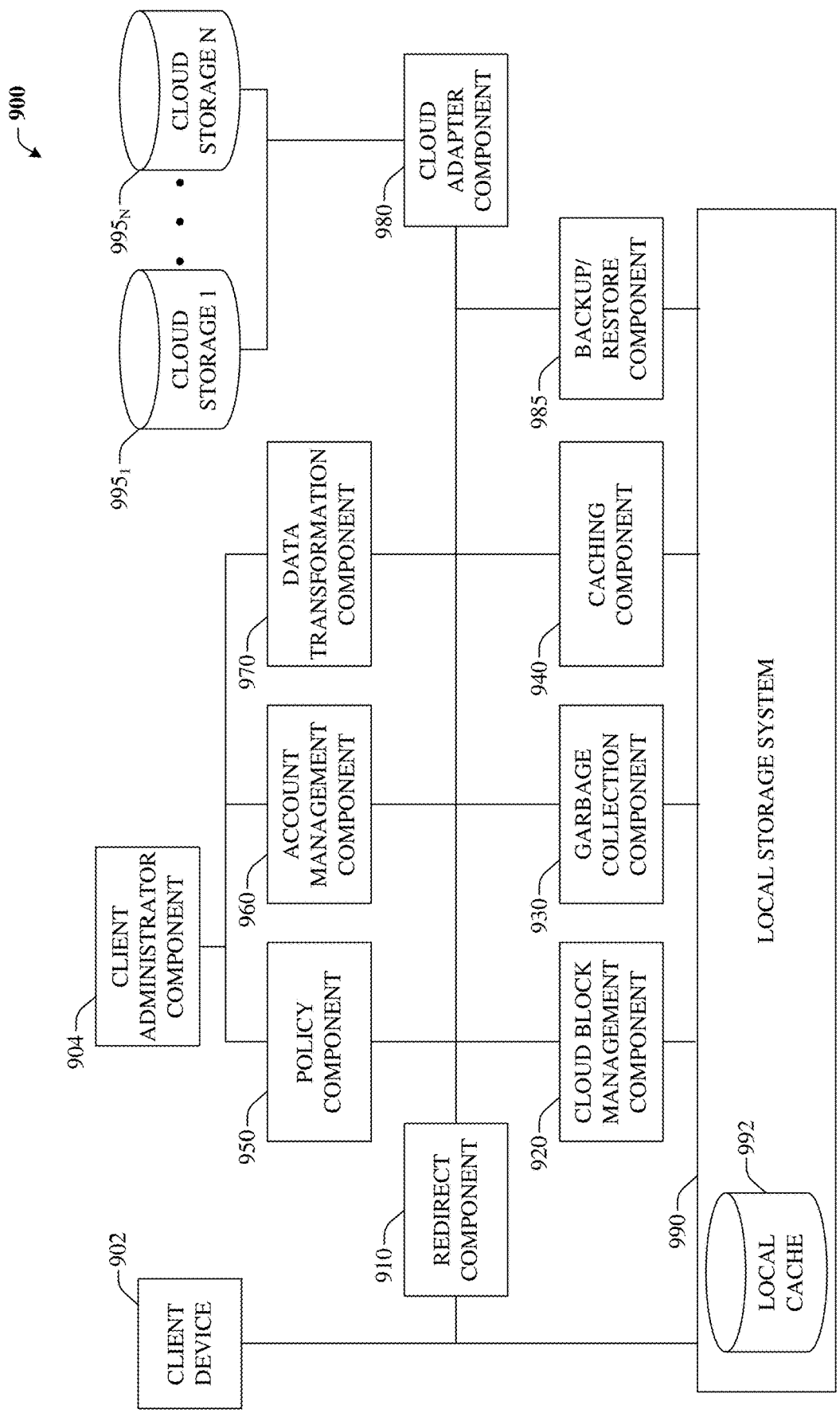
FIG. 9 illustrates a block diagram of an example distributed file storage system that employs tiered cloud storage in accordance with certain embodiments of this disclosure.
Figure 10:
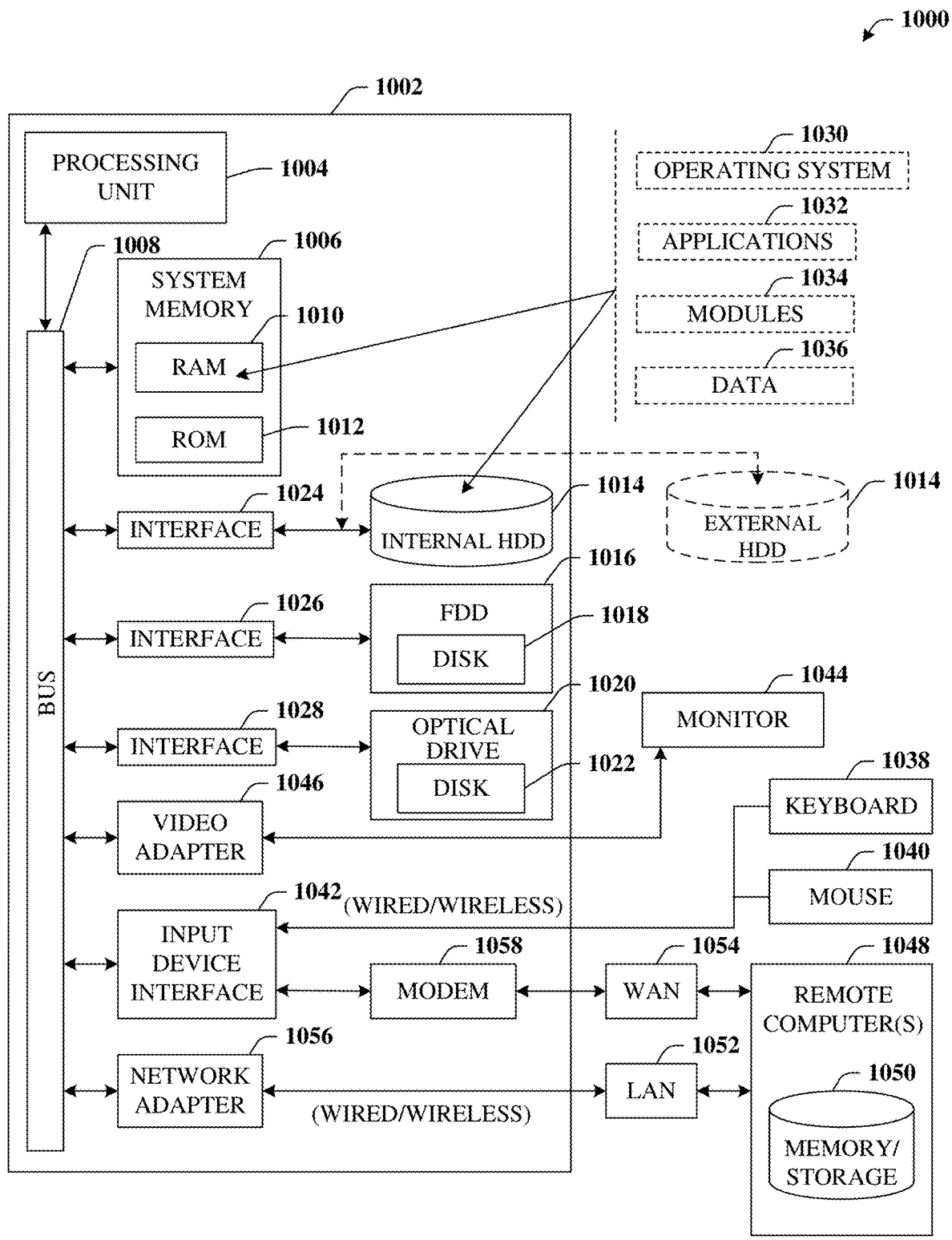
FIG. 10 illustrates an example block diagram of a computer operable to execute certain embodiments of this disclosure.

To provide further context for various aspects of the subject specification, FIGS. 9 and 10 illustrate, respectively, a block diagram of an example distributed file storage system 900 that employs tiered cloud storage and block diagram of a computer 1002 operable to execute the disclosed storage architecture in accordance with aspects described herein.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well.

As more fully described below with respect to redirect component 910, redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 may use an interface to access the policy component 950 and the account management component 960 for operations as more fully described below with respect to these components. Data transformation component 970 can operate to provide encryption and compression to files tiered to cloud storage. Cloud adapter component 980 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 997 can be utilized to back up the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 960 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on list of mappings it manages. For example, each stub can be associated with an account, and the cloud block management component 920 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of APIs. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 940 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 997 can transfer a copy of the files within the local storage system 990 to another cluster (e.g., target cluster). Further, the backup/restore component 997 can manage synchronization between the local storage system 990 and the other cluster, such that, the other cluster is timely updated with new and/or modified content within the local storage system 990.

Referring now to FIG. 10, there is illustrated a block diagram of a computer 1002 operable to execute the disclosed communication architecture. To provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), node(s), cluster(s), system(s), and/or device(s) disclosed herein can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random-access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touch screen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an infrared (IR) interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least Wi-Fi and Bluetooth® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1002.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising: a processor; and
a non-transitory memory that stores executable instructions that, when executed by the processor, facilitate performance of operations, comprising:
determining an action selected from an action group comprising: a first action in which an early I/O procedure is activated and a second action in which the early I/O procedure is not activated;
in response to comparing a current response time of a current I/O operation to a previous response time of a previous I/O operation, determining state data indicative of a current state of the current I/O operation, wherein the current state is selected from a state group comprising a first state indicative of the current response time being less than or equal to the previous response time, and a second state indicative of the current response time being greater than the previous response time; and
determining policy data that identifies a next action from among the action group that is to be applied to a next I/O procedure, wherein the next action is determined, as a function of the current state, to minimize a next response time of the next I/O operation.

2. The system of claim 1, wherein the operations further comprise instructing a device that manages the early IO procedure to operate according to the policy data.

3. The system of claim 1, wherein the current IO operation is a write operation that writes data received from a host to a first storage device and a second storage device.

4. The system of claim 1, wherein the current response time is a first average response time of multiple IO operations performed during a current time window having a fixed duration, the previous response time is a second average response time of multiple IO operations performed during a previous time window having the fixed duration, and the next response time is a third average response time of multiple IO operations performed during a next time window having the fixed duration.

5. The system of claim 4, wherein the fixed duration is between 100 milliseconds and 500 milliseconds.

6. The system of claim 1, wherein the determining the state data further comprises determining matrix data, the matrix data comprising:
probability matrixes comprising: a first probability matrix indicative of first probabilities that a state of the state group will occur in response to the first action, and a second probability matrix indicative of second probabilities that the state will occur in response to the second action; and
reward matrixes comprising: a first reward matrix indicative of first reward values assigned to an occurrence of the state in connection with the first probability matrix, and a second reward matrix indicative of second reward values assigned to the occurrence of the state in connection with the second probability matrix.

7. The system of claim 6, wherein the next action is determined to substantially minimize the next response time based on a determination that the next action has a highest reward value from among the reward values.

8. The system of claim 6, wherein the determining the policy data comprises performing a regression procedure that iteratively simulates actions of the action group when applied to an IO procedure in states of the state group in order to identify the next action.

9. The system of claim 8, wherein the regression procedure further comprises a discount factor that reduces a weight of older reward values of the reward values.

10. The system of claim 8, wherein the regression procedure further comprises a termination factor that facilitates termination of the regression procedure in response to a first iterative result of the regression procedure varying from a second iterative result of the regression procedure by less than the termination factor.

11. A method, comprising:
determining, by a device comprising a processor, an action selected from an action group that comprises a first action in which an early IO procedure is activated and a second action in which the early IO procedure is not activated;
in response to comparing a current response time of a current IO operation to a previous response time of a previous IO operation, determining, by the device, state data indicative of a current state of the current IO operation, wherein the current state is selected from a state group comprising a first state indicative of the current response time being less than or equal to the previous response time, and a second state indicative of the current response time being greater than the previous response time; and
determining, by the device, a policy that identifies a next action from among the action group that is to be applied to a next IO procedure, wherein the next action is determined, as a function of the current state, to substantially minimize a next response time of the next IO operation.

12. The method of claim 11, further comprising:
performing, by the device, a regression procedure that iteratively simulates actions of the action group when applied to an IO procedure in states of the state group in order to identify the next action.

13. The method of claim 12, further comprising:
identifying, by the device, the next action in response to determining a highest reward value from among reward values that are assigned to an occurrence of members of the state group.

14. The method of claim 12, further comprising:
terminating, by the device, the regression procedure in response to a first iterative result of the regression procedure varying from a second iterative result of the regression procedure by less than a defined amount.

* * * * *